US011561458B2

(12) United States Patent
Okuike

(10) Patent No.: US 11,561,458 B2
(45) Date of Patent: Jan. 24, 2023

(54) IMAGING APPARATUS, ELECTRONIC DEVICE, AND METHOD FOR PROVIDING NOTIFICATION OF OUTGOING IMAGE-DATA TRANSMISSION

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/251,969

(22) PCT Filed: Jul. 18, 2019

(86) PCT No.: PCT/JP2019/028291
§ 371 (c)(1),
(2) Date: Dec. 14, 2020

(87) PCT Pub. No.: WO2020/026837
PCT Pub. Date: Feb. 6, 2020

(65) Prior Publication Data
US 2021/0255526 A1   Aug. 19, 2021

(30) Foreign Application Priority Data

Jul. 31, 2018  (JP) .............................. JP2018-143970

(51) Int. Cl.
*H04N 5/222* (2006.01)
*G03B 17/18* (2021.01)
(Continued)

(52) U.S. Cl.
CPC ............. *G03B 17/18* (2013.01); *G06F 21/36* (2013.01); *G06K 9/62* (2013.01); *G06N 3/08* (2013.01);
(Continued)

(58) Field of Classification Search
CPC .......... G03B 17/18; G06F 21/36; G06K 9/62; G06N 3/08; G06N 3/02; G06V 40/10;
(Continued)

(56) References Cited

U.S. PATENT DOCUMENTS 9,106,653 B2 * 8/2015 Shogaki .................. H04L 63/10
2002/0152390 A1 10/2002 Furuyama et al.
2008/0118156 A1 * 5/2008 Okada .............. H04N 5/232945
348/E5.042
(Continued)

FOREIGN PATENT DOCUMENTS

CN   1603937 A    4/2005
CN   101510957 A   8/2009
(Continued)

OTHER PUBLICATIONS

International Search Report, International Application No. PCT/JP2019/028291, dated Oct. 11, 2019.
(Continued)

*Primary Examiner* — Usman A Khan
(74) *Attorney, Agent, or Firm* — Michael Best & Friedrich LLP

(57) ABSTRACT

An imaging apparatus (100) comprises a signal processor (130) generating image data according to an imaging result of an imaging device (110), and a data transmission status notifying part (180) controlling, when the image data has been output to the outside, a data transmission status displaying part (181) to notify that the image data has been output to the outside.

16 Claims, 9 Drawing Sheets

(51) Int. Cl.
    *G06F 21/36*     (2013.01)
    *G06K 9/62*     (2022.01)
    *G06N 3/08*     (2006.01)
    *H04N 5/232*     (2006.01)
    *G06V 40/10*     (2022.01)

(52) U.S. Cl.
    CPC ......... *G06V 40/10* (2022.01); *H04N 5/23219* (2013.01)

(58) Field of Classification Search
    CPC ........... H04N 5/23219; H04N 5/23293; H04N 5/225
    USPC ..................................................... 348/333.02
    See application file for complete search history.

(56) References Cited

U.S. PATENT DOCUMENTS

| | | | | |
|---|---|---|---|---|
| 2017/0243054 | A1* | 8/2017 | Lee | ........................ G06V 40/171 |
| 2017/0278265 | A1 | 9/2017 | Yamamoto | |
| 2018/0241902 | A1* | 8/2018 | Katayama | .......... H04N 5/23293 |

FOREIGN PATENT DOCUMENTS

| | | |
|---|---|---|
| CN | 107231519 A | 10/2017 |
| EP | 1229496 A2 | 8/2002 |
| EP | 3223192 A2 | 9/2017 |
| JP | 2002229955 A | 8/2002 |
| JP | 2005-27135 A | 1/2005 |
| JP | 2005-123817 A | 5/2005 |
| JP | 2008282428 | 11/2008 |
| JP | 2011044989 A | 3/2011 |
| JP | 2017175466 A | 9/2017 |

OTHER PUBLICATIONS

Notification of Transmittal of the International Search Report and the Written Opinion of the International Searching Authority, or the Declaration (PCT/ISA/220), International Application No. PCT/JP2019/028291, dated Oct. 21, 2019.

Chinese Office Action dated Jun. 13, 2022 for corresponding Chinese Application No. 2019800489004.

* cited by examiner

| META DATA \ IMAGE DATA | ON | OFF |
|---|---|---|
| ON | CASE 1 — IMAGE DATA / META DATA | CASE 2 — META DATA |
| OFF | CASE 3 — IMAGE DATA | CASE 4 |

FIG.5
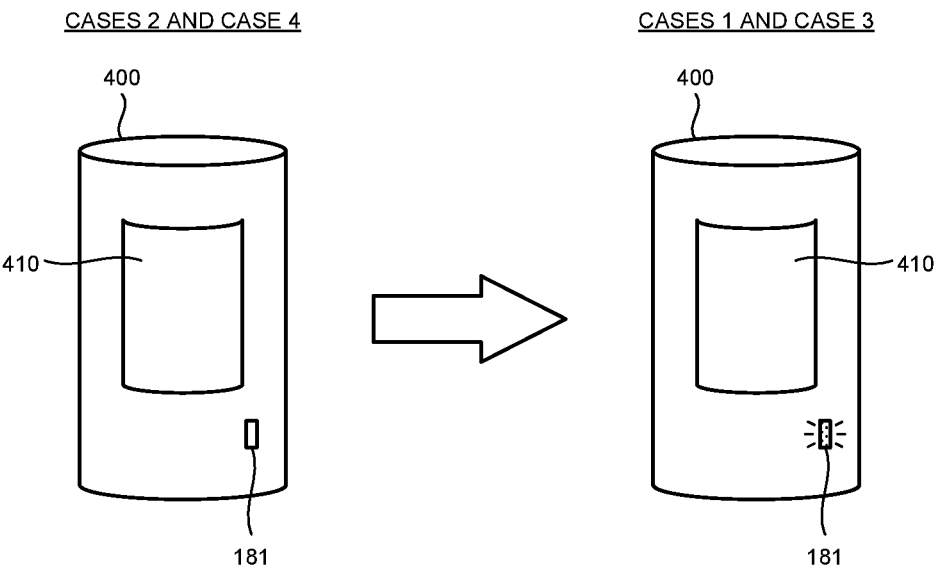
FIG.6
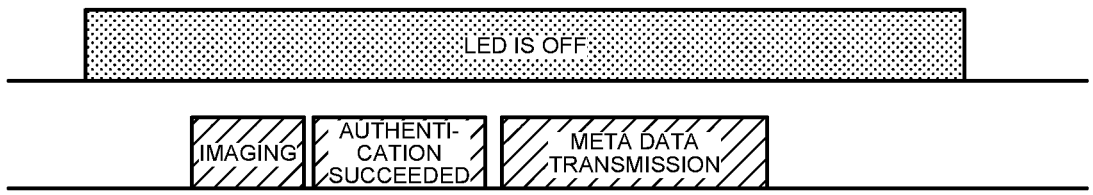
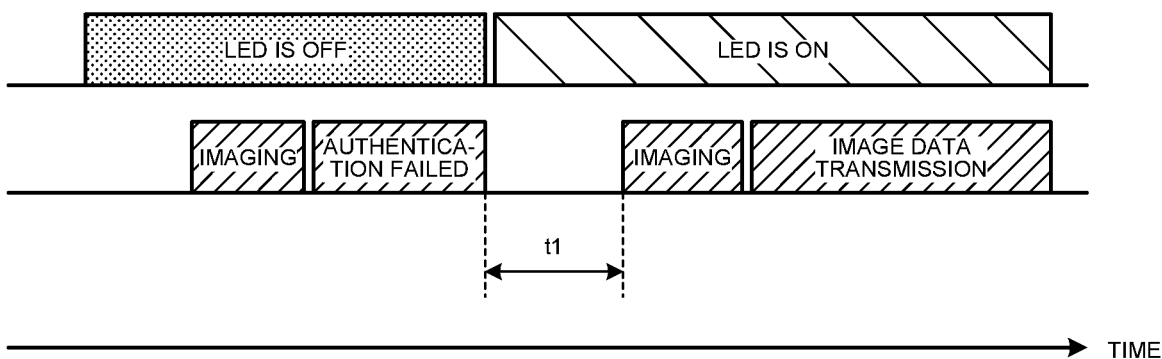

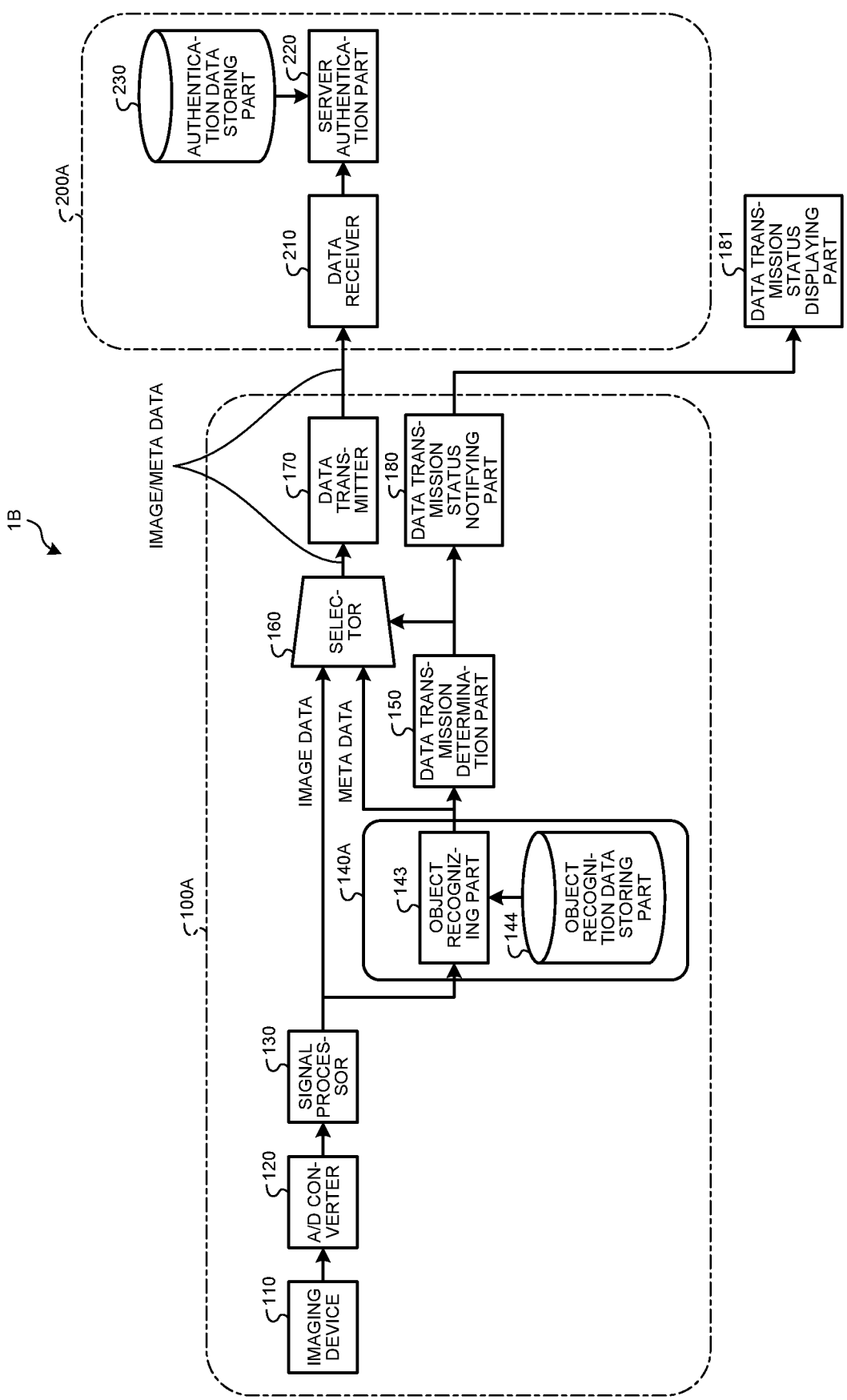

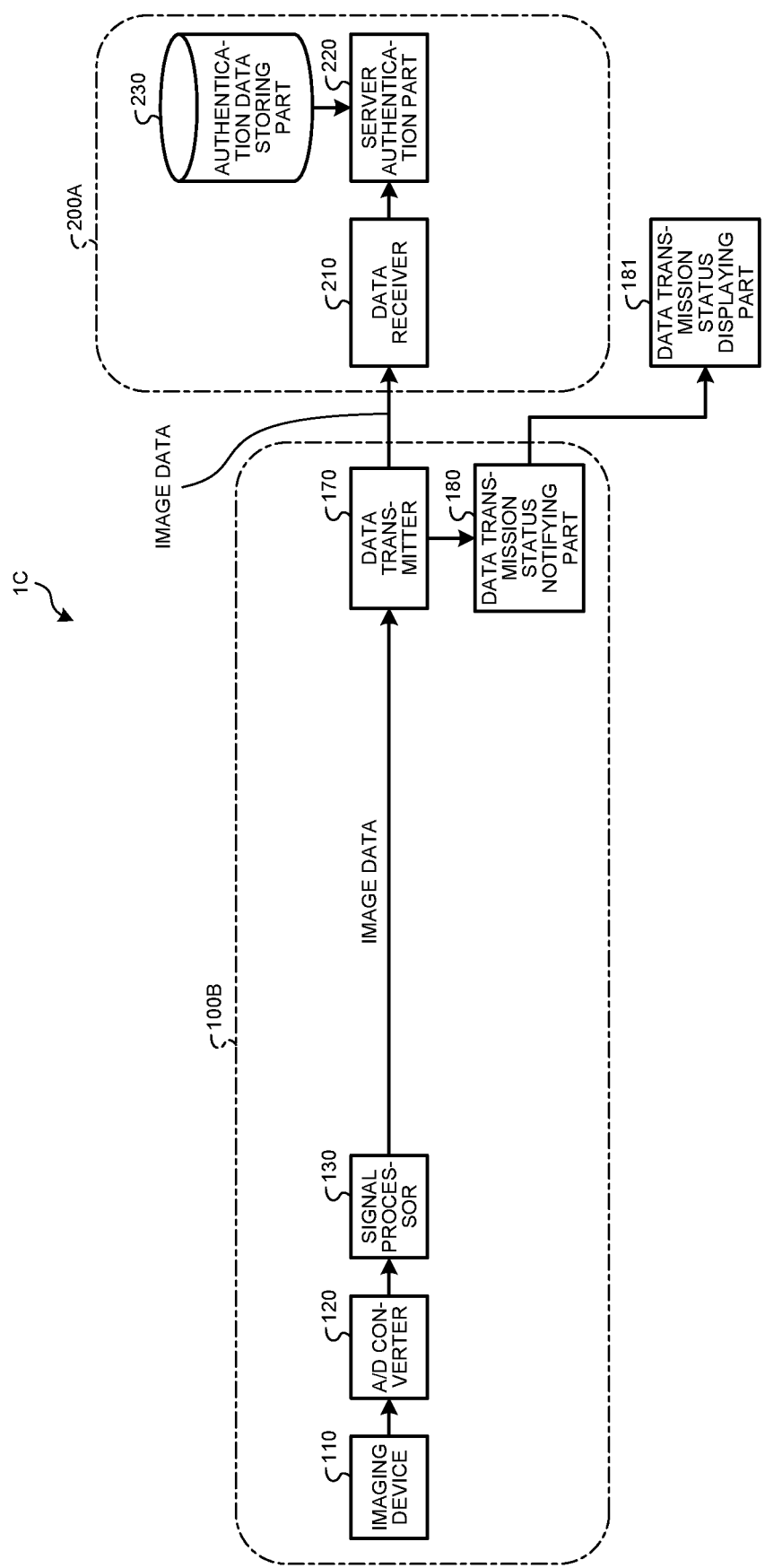

IMAGING APPARATUS, ELECTRONIC DEVICE, AND METHOD FOR PROVIDING NOTIFICATION OF OUTGOING IMAGE-DATA TRANSMISSION

FIELD

The present disclosure relates to an imaging apparatus, an electronic device, and a notification method.

BACKGROUND

A technology that prevents a leakage of an image taken with, for example, a camera to protect privacy of a photographed person is known.

For example, Patent Literature 1 discloses a technology to alert a photographer, which has been requested to photograph a photographed person, that an in-camera of a mobile phone is in operation, when the photographer photographs the photographed person with the mobile phone.

CITATION LIST

Patent Literature

Patent Literature 1: Japanese Patent Application Laid-open No. 2015-133624

SUMMARY

Technical Problem

However, in the above conventional technology, an alert is displayed according to an image displayed on a display, and thus the alert can be cleared by, for example, computer programs including an unauthorized application.

Then, the present disclosure proposes an imaging apparatus, an electronic device, and a notification method that appropriately notify whether the photographed image is being output to the outside.

Solution to Problem

To solve the problem described above, an imaging apparatus includes: a signal processor generating image data according to an imaging result of an imaging device; and a data transmission status notifying part controlling, when the image data has been output to an outside, a data transmission status displaying part to notify that the image data has been output to the outside.

Advantageous Effects of Invention

The present disclosure can appropriately notify whether a photographed image is being output to the outside. It should be noted that the effect shown here is not necessarily limited thereto, and may be any effects shown in the present disclosure.

BRIEF DESCRIPTION OF DRAWINGS

FIG. 5 is a schematic view illustrating an example of an operation of a data transmission status notifying part.

FIG. 6 is a diagram illustrating an operation of a light emitting diode (LED).

FIG. 10 is a block diagram illustrating an example of a configuration of an imaging system according to a third embodiment of the present disclosure.

FIG. 11 is a block diagram illustrating an example of a configuration of an imaging system according to a fourth embodiment of the present disclosure.

DESCRIPTION OF EMBODIMENTS

Hereinafter, embodiments of the present disclosure will be described in detail with reference to the drawings. It should be noted that, in the following embodiments, same portions will be denoted by same signs to omit redundant descriptions.

In addition, the present disclosure will be described in the following order of items.

1. First Embodiment
   1-1. Configuration of Imaging System according to First Embodiment
   1-2. Operation of Imaging System according to First Embodiment
   1-3. Operation of Modification of Imaging System according to First Embodiment
2. Second Embodiment
   2-1. Configuration of Imaging System according to Second Embodiment
3. Third Embodiment
   3-1. Configuration of Imaging System according to Third Embodiment
4. Fourth Embodiment
   4-1. Configuration of Imaging System according to Fourth Embodiment

1. First Embodiment

1-1. Configuration of Imaging System According to First Embodiment

Figure 1:
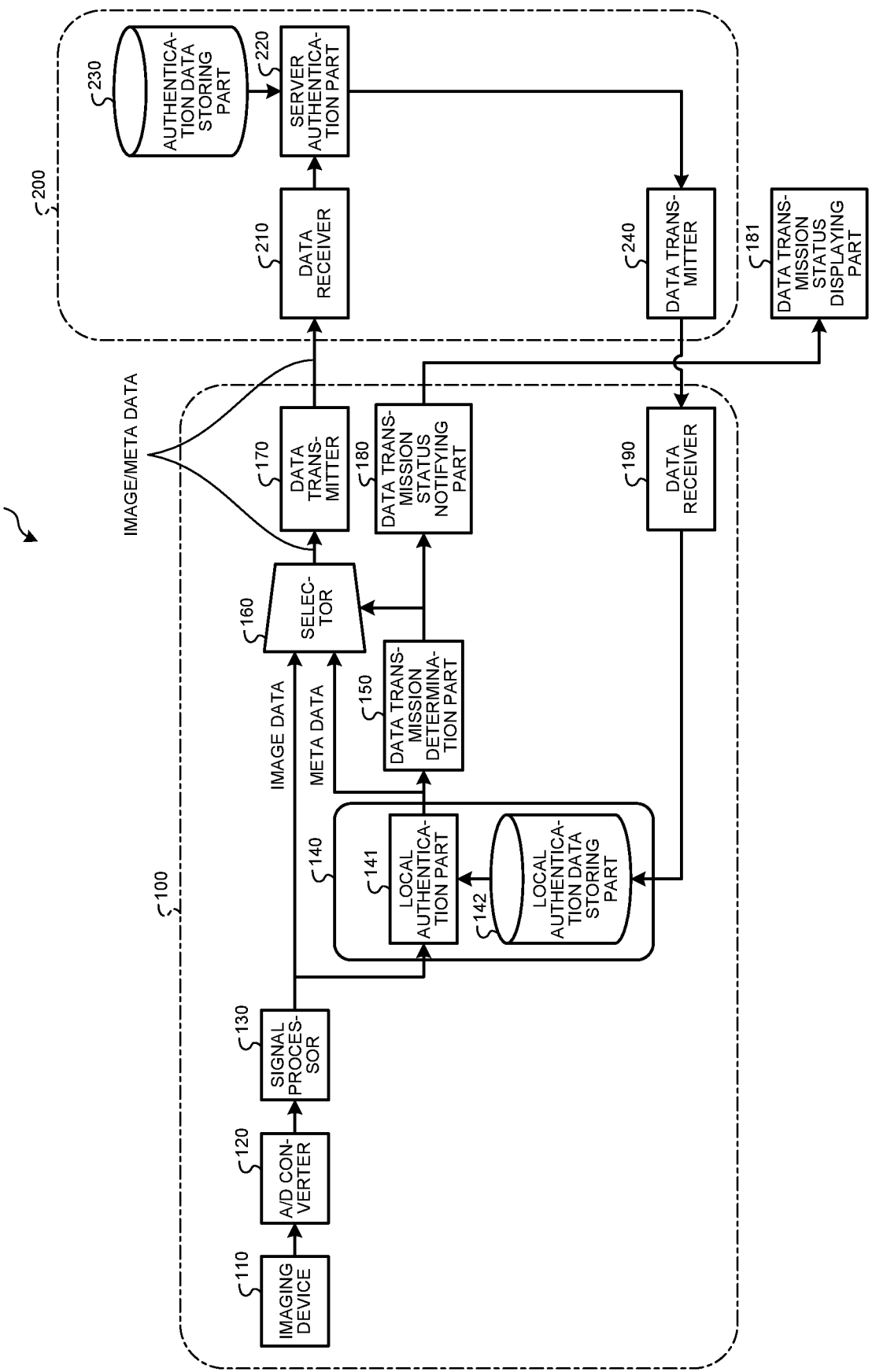
FIG. 1 is a block diagram illustrating an example of a configuration of an imaging system according to a first embodiment of the present disclosure.

Referring to FIG. 1, a configuration of an imaging system according to the first embodiment of the present disclosure will be described. FIG. 1 is a block diagram illustrating the configuration of the imaging system according to the first embodiment of the present disclosure.

As illustrated in FIG. 1, an imaging system 1 includes an imaging apparatus 100 and a server 200. In the imaging system 1, image data is transmitted from the imaging apparatus 100 to the server 200 via an unillustrated application processor.

The imaging apparatus 100 includes an imaging device 110, an analog to digital (A/D) converter 120, a signal processor 130, a machine learning unit 140, a data transmission determination part 150, a selector 160, a data transmitter 170, a data transmission status notifying part 180, and a data receiver 190. The imaging apparatus 100 of the present disclosure can be applied to electronic devices including a digital camera, a tablet terminal, a smartphone, a mobile phone, a personal computer, a head mounted display, an in-vehicle device, a wearable device, a drone, and a game machine. However, the imaging apparatus 100 is not limited thereto.

The imaging device 110 is, for example, a complementary metal oxide semiconductor (CMOS) image sensor. The imaging device 110 receives incident light from an unillustrated lens. The imaging device 110 performs photoelectric conversion on the received light to generate image data corresponding to the incident light. The imaging device 110 outputs the generated image data to the A/D converter 120.

The A/D converter 120 converts the image data into a digital signal. The A/D converter 120 outputs the image data converted into the digital signal to the signal processor 130.

The signal processor 130 generates image data for output from the image data converted into the digital signal.

Figure 2:
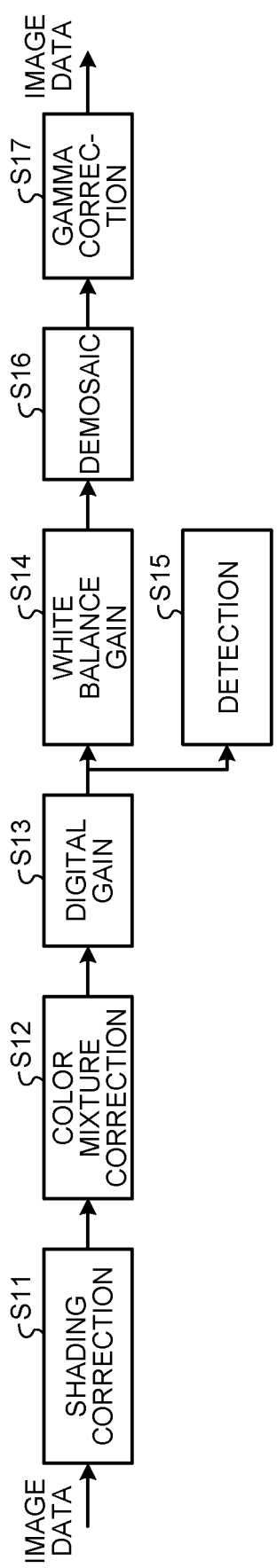
FIG. 2 is a schematic view illustrating an example of processing by a signal processor.

Referring to FIG. 2, specific processing performed by the signal processor 130 will be described. FIG. 2 is a schematic view illustrating an example of the processing by the signal processor 130.

As illustrated in FIG. 2, the signal processor 130 performs shading correction (step S11), color mixture correction (step S12), and digital gain adjustment (step S13) on the received image data. The signal processor 130 performs, for example, white balance gain adjustment (step S14), demosaic processing (step S16), and gamma correction (step S17) on the image data, on which digital gain adjustment has been performed, to generate image data for output. In addition, the signal processor 130 performs detection (step S15) on the image data, on which digital gain adjustment has been performed. The signal processor 130 outputs the image data to the machine learning unit 140 and the selector 160.

The machine learning unit 140 uses, for example, a deep neural network (DNN) to learn a feature amount for recognizing the type of an object included in the image data, and then feeds the feature amount into a DNN model. The machine learning unit 140 uses, for example, a DNN to recognize, according to the DNN model, the object included in the image data. The machine learning unit 140 includes a local authentication part 141 and a local authentication data storing part 142.

The local authentication part 141 uses, for example, a DNN to recognize whether a specific object is included in the image data. The local authentication part 141 uses, for example, a DNN to recognize whether a specific person is included in the image data (local authentication).

Figures 3, 4:
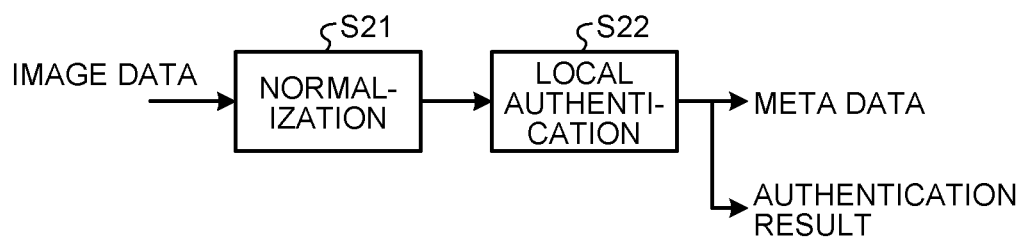
FIG. 3 is a schematic view illustrating an example of processing by a local authentication part.
FIG. 4 is a diagram illustrating combinations of data that an imaging apparatus according to the first embodiment of the present disclosure transmits to the outside.

Referring to FIG. 3, processing performed by the local authentication part 141 will be described. FIG. 3 is a diagram illustrating an example of the processing by the local authentication part 141.

As illustrated in FIG. 3, the local authentication part 141 normalizes the received image data (step S21). At this step, the local authentication part 141 normalizes, for example, brightness of the received image data. The local authentication part 141 performs local authentication on the normalized image data (step S22). The local authentication part 141 outputs an authentication result of local authentication to the data transmission determination part 150. The local authentication part 141 generates meta data of the image data, and then outputs the generated meta data to the selector 160.

The local authentication data storing part 142 stores data for allowing the local authentication part 141 to perform local authentication. Specifically, the local authentication data storing part 142 stores a model for allowing the local authentication part 141 to implement a DNN. This allows the local authentication part 141 to perform local authentication according to the model stored in the local authentication data storing part 142.

The data transmission determination part 150 determines whether to transmit at least one of the image data generated by the signal processor 130 or the meta data generated by the machine learning unit 140 to the server 200. Specifically, the data transmission determination part 150 determines, according to the authentication result of the local authentication part 141, to transmit the meta data when the local authentication by the local authentication part 141 has succeeded, and to transmit the image data when the local authentication has failed. The data transmission determination part 150 outputs an instruction to the selector 160 to output which of the image data and the meta data. The data transmission determination part 150 outputs, when it has determined to transmit the image data, an instruction to operate a data transmission status displaying part 181 to the data transmission status notifying part 180. In addition, although specific description will be given later, the data transmission determination part 150 may determine to transmit both the image data generated by the signal processor 130 and the meta data generated by the machine learning unit 140 to the server 200.

The data transmission determination part 150 may output the instruction to operate the data transmission status displaying part 181 to the data transmission status notifying part 180, even when, for example, the local authentication part 141 has performed person recognition and transmitted the meta data to the server 200. This configuration can achieve higher security because the meta data, on which person recognition has been performed, can include privacy information. At this step, the data transmission determination part 150 may output the instruction to operate the data transmission status displaying part 181 to the data transmission status notifying part 180, only when the meta data includes privacy information. In this case, whether the meta data includes privacy information may be determined by, for example, the local authentication part 141 with a DNN.

The selector 160 outputs the image data or the meta data to the data transmitter 170 according to the instruction of the data transmission determination part 150.

The data transmitter 170 outputs the image data or the meta data that has been received from the selector 160 to a data receiver 210 of the server 200.

The data transmission status notifying part 180 operates the data transmission status displaying part 181 according to a result of determination of the data transmission determination part 150. The data transmission status notifying part 180 operates the data transmission status displaying part 181 while the image data is being transmitted to the server 200.

The data transmission status displaying part 181 notifies, according to the instruction from the data transmission status notifying part 180, that the image data is being transmitted to the server 200. In other words, the processing for operating the data transmission status displaying part 181 is enclosed within the imaging apparatus 100 and independent of the processing performed by, for example, an application processor. In other words, only with the processing within the imaging apparatus 100, a photographed person can be notified. The data transmission status displaying part 181 can be implemented with, for example, a light emitting diode (LED). In this case, the data transmission status notifying part 180 turns the LED on while the image data is being transmitted to the server 200. It should be noted that the data transmission status displaying part 181 is not limited to an LED. The data transmission status displaying part 181 may include, for example, a sound output part or a display. When the data transmission status displaying part 181 is a sound output part, the data transmission status notifying part 180 makes a notification with a sound while the image data is being transmitted to the server 200. Such a sound output part can be implemented with, for example, a speaker. When the data transmission status displaying part 181 is a display, the data transmission status notifying part 180 makes a notification by displaying a specific image on the display while the image data is being transmitted to the server 200. Such a display is, for example, a liquid crystal display (LCD) or an organic electro-luminescence (EL) display.

Referring to FIGS. 4 and 5, the operations of the data transmitter 170 and the data transmission status displaying part 181 will be described. FIG. 4 is a diagram illustrating combinations of the image data and the meta data that the data transmitter 170 transmits to the server 200. FIG. 5 is a schematic view illustrating an example of an operation of the data transmission status displaying part 181.

As illustrated in FIG. 4, four cases are expected for the combination of the image data and the meta data that the data transmitter 170 transmits. Case 1 is the case in which the data transmitter 170 transmits both the image data and the meta data to the server 200. Case 2 is the case in which the data transmitter 170 transmits only the meta data to the server 200. Case 3 is the case in which the data transmitter 170 transmits only the image data to the server 200. Case 4 is the case in which the data transmitter 170 transmits neither the image data nor the meta data to the server 200. According to each case, the operation of the data transmission status displaying part 181 varies.

FIG. 5 illustrates an electronic device 400 provided with the imaging apparatus 100, in which the data transmission status displaying part 181 is an LED. As illustrated in FIG. 5, at cases 2 and 4, the data transmission status displaying part 181 is turned off. At cases 1 and 3, the data transmission status displaying part 181 is turned on. This configuration allows the photographed person to visually check the data transmission status displaying part 181 to recognize that the image data is being transmitted to the server 200.

In addition, when the data transmission status displaying part 181 is an LED, the LED may light up, blink, and change its color according to the data transmission status and the type of the transmitted data. For example, the LED may be turned off only when the data is not being transmitted, and may be lit up in a different color or in a different pattern of the lighting when the image data, the meta data, or the data including privacy information is being transmitted to the outside. In addition, when the data transmission status displaying part 181 is a sound output part, according to the type of the transmitted data, the type of the output sound may be changed or the volume of the output sound may be increased. In addition, when the data transmission status displaying part 181 is a display, according to, for example, the type of the data transmitted to a display 410 of the electronic device 400 illustrated in FIG. 5, a different alert may be displayed. This configuration allows the photographed person to recognize the detail of the data that is being transmitted from the imaging apparatus 100 to the server 200. In other words, in the present disclosure, the photographed person can be notified that the data is being transmitted from the imaging apparatus 100 to the server 200, only with the processing, at the stage before the data is transmitted to the server 200, of the imaging apparatus 100. This configuration allows the photographed person to recognize that the photographed person's own image data is being transmitted to the outside.

Referring to FIG. 6, the operation of the LED, in the period from the imaging by the imaging apparatus 100 to the transmission of the image data or the meta data, will be described. FIG. 6 is a schematic view illustrating the operations of the LED when the local authentication has succeeded and when the local authentication has failed.

As illustrated in FIG. 6, the LED is turned off at the initial state. When the local authentication, after imaging, has succeeded, the meta data is transmitted. In this case, the LED remains off. On the other hand, when the local authentication, after imaging, has failed, the LED is turned on. In this case, the image data is transmitted when the imaging has been performed, for example, t1 seconds after the lighting of the LED.

FIG. 1 is referred to again. The data receiver 190 receives, for example, the authentication result of the image data output from the server 200. The data receiver 190 outputs, when the result of the successful authentication has been received from the server 200, the authentication result to the local authentication data storing part 142. This configuration updates the model stored in the local authentication data storing part 142. Thus, the local authentication part 141 can succeed in the local authentication on the present subject, the image data of which has been transmitted to the server 200, from the next time.

The server 200 includes the data receiver 210, a server authentication part 220, an authentication data storing part 230, and a data transmitter 240.

The data receiver 210 receives the image data or the meta data from the data transmitter 170 of the imaging apparatus 100. The data receiver 210 outputs, when it has received the image data from the data transmitter 170 of the imaging apparatus 100, the received image data to the server authentication part 220.

The server authentication part 220 authenticates whether the subject included in the image data is the pre-registered subject. Specifically, the server authentication part 220 authenticates, according to the authentication data previously stored in the authentication data storing part 230, whether the subject included in the image data is the pre-registered subject. The server authentication part 220 outputs, when the subject included in the image data is the pre-registered subject, update data for updating the DNN model stored in the local authentication data storing part 142 to the data transmitter 240.

The data transmitter 240 transmits the update data for updating the DNN model stored in the local authentication data storing part 142 to the data receiver 190 of the imaging apparatus 100. This configuration allows the imaging apparatus 100 to update the DNN model stored in the local authentication data storing part 142.

1-2. Operation of Imaging System

Figure 7:
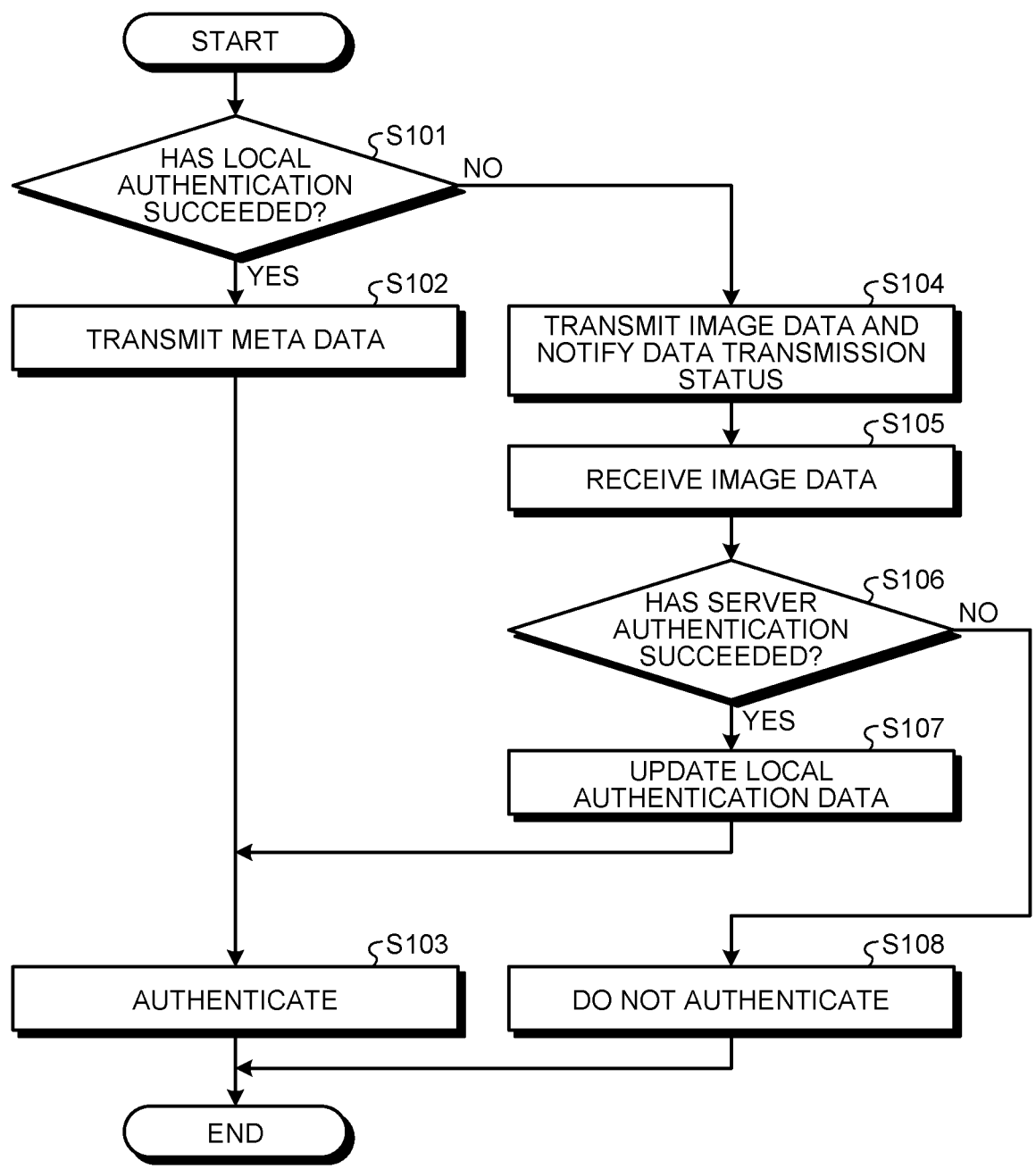
FIG. 7 is a flowchart illustrating an example of processing flow of the imaging system according to the first embodiment of the present disclosure.

Referring to FIG. 7, an operation flow of the imaging system 1 according to the first embodiment will be described. FIG. 7 is a flowchart illustrating the operation flow of the imaging system 1 according to the first embodiment.

Firstly, the imaging apparatus 100 performs local authentication on the imaged subject. Specifically, the imaging apparatus 100 performs, with the local authentication part 141, the local authentication on the imaged subject.

When the local authentication has succeeded (Yes at S101), the imaging apparatus 100 transmits the meta data to the server 200 (step S102). In this case, the server 200 authenticates the meta data transmitted from the imaging apparatus 100 (step S103). Then, the imaging system 1 terminates the processing in FIG. 7.

On the other hand, when the local authentication has failed (No at step S101), the imaging apparatus 100 transmits the image data to the server 200 via an application processor, and operates the data transmission status displaying part 181 to notify the data transmission status at the same time (step S104).

The server 200 receives the image data transmitted from the imaging apparatus 100 (step S105). The server 200 performs server authentication on the image data. Specifically, the server 200 performs the server authentication, with the server authentication part 220, on the image data.

When the server authentication has succeeded (Yes at S106), the server 200 transmits the update data for the local authentication data to the imaging apparatus 100. Then, the imaging apparatus 100 updates the local authentication data stored in the local authentication data storing part 142 (step S107). Then, the processing at step S103 is performed, and then the imaging system 1 terminates the processing in FIG. 7.

On the other hand, when the server authentication has failed (No at step S106), the server 200 does not authenticate the transmission of the image data (step S108). Then, the imaging system 1 terminates the processing in FIG. 7.

As described above, in the first embodiment, the photographed person is notified that the image data taken by the imaging apparatus 100 has been transmitted to the outside. This configuration allows the photographed person to recognize whether information on the photographed person's own privacy has been transmitted to the outside.

1-3. Operation of Modification of Imaging System

Figure 8:
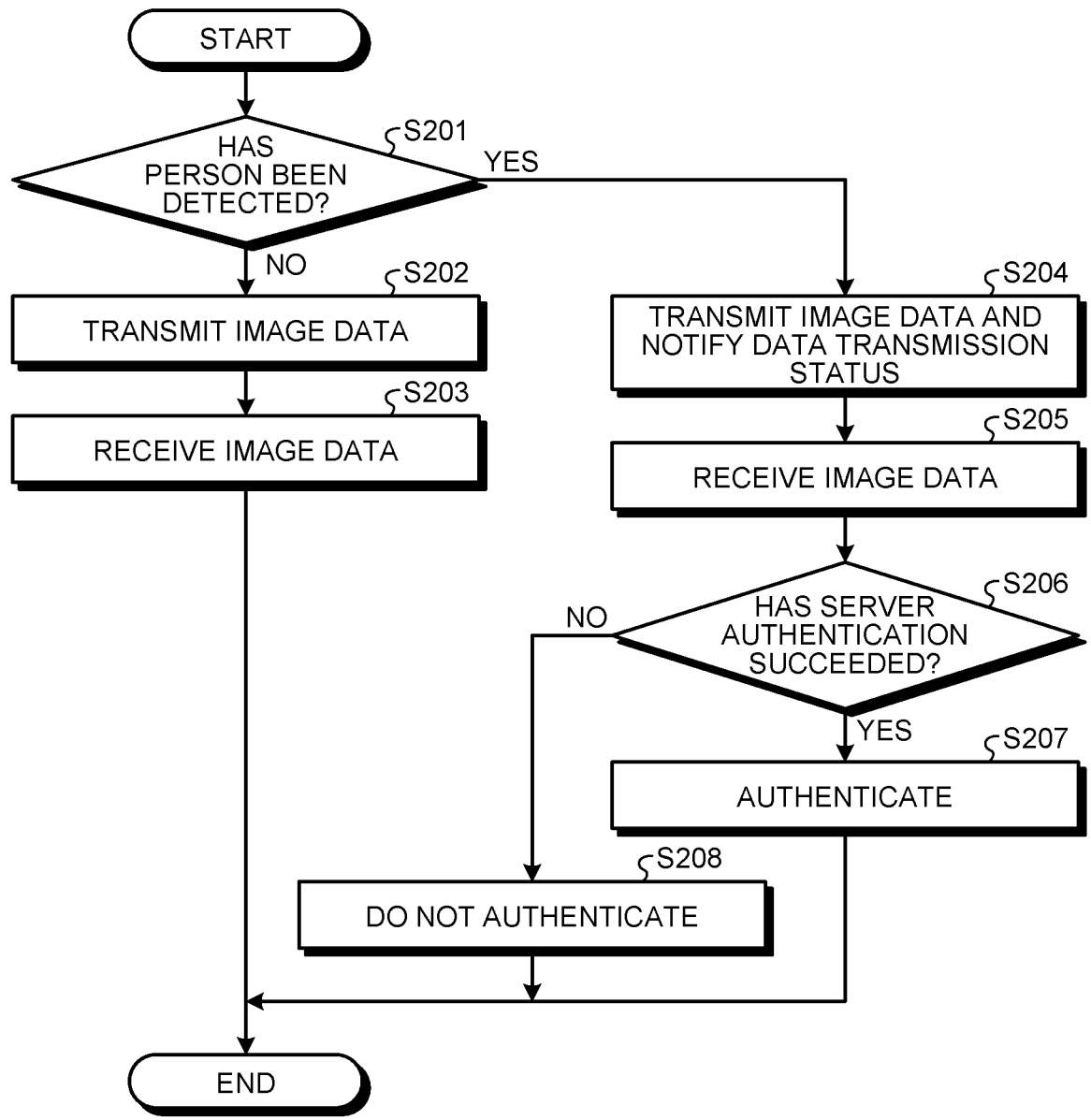
FIG. 8 is a flowchart illustrating an example of a processing flow of a modification of the imaging system according to the first embodiment of the present disclosure.

Referring to FIG. 8, an operation flow of a modification of the imaging system 1 according to the first embodiment will be described. FIG. 8 is a flowchart illustrating the operation flow of the modification of the imaging system 1 according to the first embodiment. Specifically, in the processing illustrated in FIG. 8, the local authentication part 141 detects a person in the image data.

When the local authentication part 141 has not detected a person in the image data (No at S201), the imaging apparatus 100 transmits the image data to a server 200A (step S202). Then, the server 200 receives the image data (step S203). Then, the imaging system 1 terminates the processing in FIG. 8.

On the other hand, when a person has been detected in the image data (Yes at step S201), the imaging apparatus 100 transmits the image data to the server 200, and operates the data transmission status displaying part 181 to notify the data transmission status at the same time (step S204).

When the server authentication has succeeded (Yes at step S206), the server 200 authenticates the transmission of the image data. Then, the imaging system 1 terminates the processing in FIG. 8.

On the other hand, when the server authentication has failed (No at step S206), the server 200 does not authenticate the transmission of the image data. Then, the imaging system 1 terminates the processing in FIG. 8.

As described above, in the modification of the first embodiment, whether image data includes a person is detected, and then the photographed person is notified that the image data has been transmitted to the outside only when the image data includes a person. This configuration allows the photographed person to recognize better whether information on the photographed person's own privacy has been transmitted to the outside.

2. Second Embodiment 2-1. Configuration of Imaging System

Figure 9:
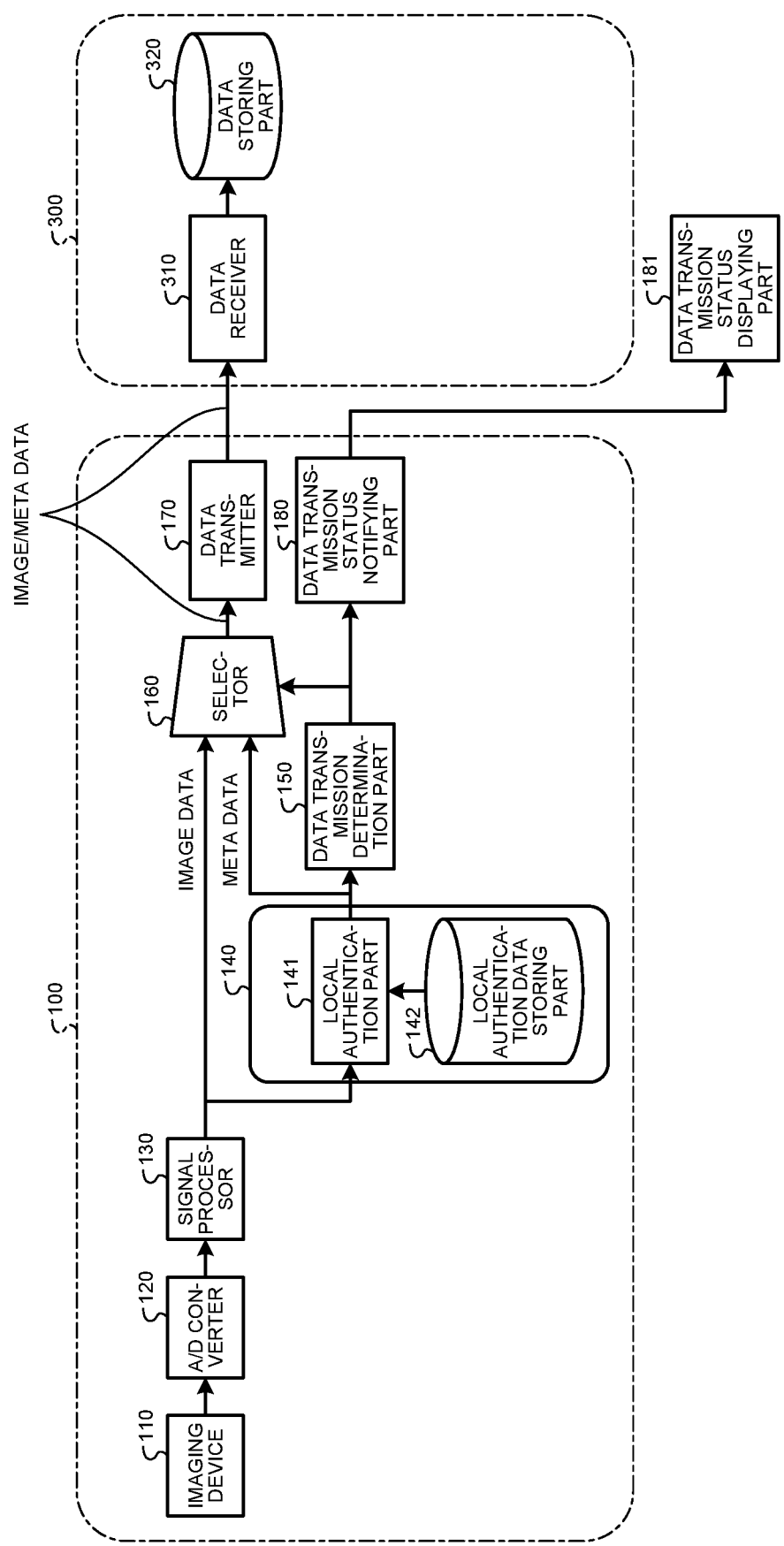
FIG. 9 is a block diagram illustrating a configuration of an imaging system according to a second embodiment of the present disclosure.

Referring to FIG. 9, an imaging system 1A according to the second embodiment of the present disclosure will be described. FIG. 9 is a block diagram illustrating a configuration of the imaging system 1A according to the second embodiment of the present disclosure.

As illustrated in FIG. 9, the imaging system 1A includes the imaging apparatus 100 and an external storage medium 300. In other words, the second embodiment differs from the first embodiment in that the external storage medium 300 is included instead of the server 200. In the imaging system 1A, image data is input from the imaging apparatus 100 to the external storage medium 300 without going through an application processor.

The external storage medium 300 includes a data receiver 310 and a data storing part 320. The data receiver 310 receives the image data or the meta data of the subject from a data transmitter 170. The data receiver 310 outputs the image data or the meta data to the data storing part 320. The data storing part 320 stores the image data and the meta data of the subject. The external storage medium 300 is not specifically limited and may be, for example, a serial peripheral interface (SPI) flash-memory or an SD card.

The data transmission status notifying part 180 operates the data transmission status displaying part 181 when the image data has been transmitted to the external storage medium 300. In other words, in the second embodiment, the data transmission status displaying part 181 is operated while the image data is being stored in the external storage medium 300. In other words, in the present disclosure, even when the image data is input to the external storage medium 300 without going through an application processor, the photographed person can be notified, only with the processing within the imaging apparatus 100.

As described above, in the second embodiment, the photographed person is notified that the image data taken by the imaging apparatus 100 has been stored in the external storage medium 300. This configuration allows the photographed person to recognize whether information on the photographed person's own privacy has been stored in a storage medium.

3. Third Embodiment 3-1. Configuration of Imaging System

Referring to FIG. 10, an imaging system 1B according to the third embodiment of the present disclosure will be described. FIG. 10 is a block diagram illustrating a configuration of the imaging system 1B according to the third embodiment of the present disclosure.

As illustrated in FIG. 10, the imaging system 1B includes an imaging apparatus 100A and a server 200A. The imaging apparatus 100A differs from the first embodiment in that a machine learning unit 140A includes an object recognizing part 143 instead of the local authentication part 141, and an object recognition data storing part 144 instead of the local authentication data storing part 142. The server 200A differs from the first embodiment in that the data transmitter 240 is not included. In the imaging system 1B, the image data is transmitted from the imaging apparatus 100A to the server 200A via an application processor that is not illustrated.

The object recognizing part 143 recognizes an object included in the image data received from the signal processor 130. Specifically, the object recognizing part 143 uses the DNN model stored in the object recognition data storing part 144 to recognize the object included in the image data, and then generates, when the object has been recognized, the meta data. The object recognizing part 143 outputs the recognition result of the object to the data transmission determination part 150.

The object recognition data storing part 144 stores object recognition data to allow the object recognizing part 143 to recognize an object. Specifically, the object recognition data storing part 144 stores the DNN model to allow the object recognizing part 143 to recognize an object included in the image data.

The data transmission determination part 150 outputs, when the object recognizing part 143 has succeeded in object recognition, an instruction to the selector 160 to output both the image data and the meta data. The data transmission determination part 150 outputs, when the object recognizing part 143 has failed in the object recognition, an instruction to the selector 160 to output neither the image data nor the meta data.

The data transmitter 170 transmits, when the object recognizing part 143 has succeeded in the object recognition, the image data and the meta data to the data receiver 210 of the server 200A. The data transmitter 170 transmits, when the object recognizing part 143 has failed in the object recognition, neither the image data nor the meta data to the data receiver 210 of the server 200A.

The data transmission status notifying part 180 operates the data transmission status displaying part 181 while the image data and the meta data are being transmitted to the data receiver 210 of the server 200A. In other words, in the present disclosure, the photographed person can be notified that the image data and the meta data are being transmitted from the imaging apparatus 100A to the server 200A, only with the processing within the imaging apparatus 100A.

As described above, in the third embodiment, it is notified that both the image data and the meta data have been transmitted from the imaging apparatus 100A to the server 200A. This configuration allows, even when both the image data and the meta data are transmitted from the imaging apparatus 100A to the outside as in the case of the object recognition, recognition of the data being transmitted to the outside.

4. Fourth Embodiment

4-1. Configuration of Imaging System

Referring to FIG. 11, an imaging system 1C according to the fourth embodiment of the present disclosure will be described. FIG. 11 is a block diagram illustrating a configuration of the imaging system 1C according to the fourth embodiment of the present disclosure.

As illustrated in FIG. 11, the imaging system 1C includes an imaging apparatus 100B and the server 200A. The imaging apparatus 100B differs from the first embodiment in that the machine learning unit 140, the data transmission determination part 150, and the selector 160 are not included. In other words, the imaging apparatus 100B is an imaging apparatus that does not implement a DNN.

In the fourth embodiment, the signal processor 130 outputs the image data to the data transmitter 170. The data transmitter 170 transmits the image data to the server 200A, and outputs a signal, which indicates that the image data has been transmitted, to the data transmission status notifying part 180 at the same time. The data transmission status notifying part 180 receives the signal from the data transmitter 170, and then controls the data transmission status displaying part 181 to notify that the image data is being transmitted to the server 200A. In other words, in the fourth embodiment, notification is always performed when data has been transmitted from the imaging apparatus 100B to the server 200A. In other words, in the present disclosure, the photographed person can be notified that the image data is being transmitted from the imaging apparatus 100 to the server 200A, only with the processing within the imaging apparatus 100B.

As described above, in the fourth embodiment, the photographed person is notified that the image data taken by the imaging apparatus 100B has been transmitted to the server 200A. This configuration allows the photographed person to recognize whether the information on the photographed person's own privacy has been transmitted to the outside.

It should be noted that the effect described in the present description is simply an example and not limited thereto, and any other effects may be exerted.

The present technology may also have the following configurations.

(1)

An imaging apparatus comprising:

a signal processor generating image data according to an imaging result of an imaging device; and a data transmission status notifying part controlling, when the image data has been output to an outside, a data transmission status displaying part to notify that the image data has been output to the outside.

(2)

The imaging apparatus according to (1), further comprising a machine learning unit generating meta data of the image data generated by the signal processor, wherein the imaging apparatus outputs at least one of the image data or the meta data to the outside.

(3)

The imaging apparatus according to (2), wherein the imaging apparatus outputs, according to an authentication result of the image data at the machine learning unit, the meta data to the outside when local authentication has succeeded, and outputs the image data to the outside when the local authentication has failed.

(4)

The imaging apparatus according to (2) or (3), wherein the imaging apparatus outputs both the image data and the meta data to the outside.

(5)

The imaging apparatus according to (2) or (3), wherein when the machine learning unit has recognized that the image data includes privacy information, the data transmission status notifying part controls, even when only the meta data has been output to the outside, the data transmission status displaying part.

(6)

The imaging apparatus according to any one of (2) to (5), wherein the data transmission status notifying part makes a notification with the data transmission status displaying part when the image data includes a person according to a result of recognition by the machine learning unit, and makes no notification with the data transmission status displaying part when the image data includes no person.

(7)

The imaging apparatus according to any one of (1) to (6), wherein the data transmission status displaying part includes at least one of a light emitting part, a sound output part, or a display.

(8)

The imaging apparatus according to any one of (1) to (7), wherein the data transmission status displaying part performs different notification according to a type of data transmitted to the outside.

(9)

The imaging apparatus according to any one of (1) to (8), wherein an output destination of the image data is an application server.

(10)

The imaging apparatus according to any one of (1) to (8), wherein an output destination of the image data is an external storage medium.

(11)

An electronic device comprising an imaging apparatus comprising:

a signal processor generating image data according to an imaging result of an imaging device; and a data transmission status notifying part controlling, when the image data has been output to an outside, a data transmission status displaying part to notify that the image data has been output to the outside.

(12)

A notification method, comprising:

generating image data according to an imaging result of an imaging device; and controlling, when the image data has been output to the outside, a data transmission status displaying part to notify that the image data has been output to the outside.

REFERENCE SIGNS LIST 1, 1A, 1B, 1C Imaging system
100, 100A, 100B Imaging apparatus
110 Imaging device
120 Analog to digital (A/D) converter
130 Signal processor
140, 140A Machine learning unit
141 Local authentication part
142 Local authentication data storing part
143 Object recognizing part
144 Object recognition data storing part
150 Data transmission determination part
160 Selector
170, 240 Data transmitter
180 Data transmission status notifying part
181 Data transmission status displaying part
200, 200A Application server
210, 310 Data receiver
220 Server authentication part
230 Authentication data storing part
300 External storage medium
320 Data storing part
400 Electronic device
410 Display

The invention claimed is:

1. An apparatus, comprising an electronic device that includes:

a signal processor configured to generate image data according to an imaging result of an imaging device;

a controller for controlling operations of a data transmission status displaying part capable of notifying that the image data is output to an outside of the electronic device, the data transmission status displaying part including at least one of a light emitting diode, a speaker, and a display; and a machine learning device configured to generate meta data according to local authentication of the image data therein and further configured to recognize whether or not the image data include privacy information;

wherein the electronic device is configured to output the meta data to the outside when the local authentication is successful and is further configured to output the image data to the outside when the local authentication fails; and wherein the controller is configured to cause the data transmission status displaying part to make a notification when the image data are transmitted to the outside and when the meta data are transmitted to the outside and the machine learning device has recognized that the image data include privacy information.

2. The apparatus according to claim 1, wherein the controller is configured to cause the data transmission status displaying part to make no notification when the image data do not represent a person.

3. The apparatus according to claim 1, wherein the controller is configured to cause the data transmission status displaying part to make different respective notifications for different types of data transmitted to the outside.

4. The apparatus according to claim 1, wherein an output destination of the image data is an application server.

5. The apparatus according to claim 1, wherein an output destination of the image data is an external storage medium.

6. The apparatus according to claim 1, wherein the controller is configured to cause the data transmission status displaying part not to make a notification when only the meta data are transmitted to the outside and the machine learning device has recognized that the image data do not include privacy information.

7. The apparatus according to claim 1, wherein the electronic device is configured to update local authentication data of the machine learning device with update data received from the outside in response to the outputted image data.

8. The apparatus according to claim 7, wherein the machine learning device comprises a deep neural network and a data storage for storing the local authentication data.

9. The apparatus according to claim 1, further comprising a server externally connected to the electronic device and configured to perform server authentication of the outputted image data;

wherein the server is configured to transmit to the electronic device update data when the server authentication of the outputted image data succeeds; and wherein the electronic device is configured to update local authentication data of the machine learning device with the update data received from the server.

10. A notification method performed by an electronic device, the method comprising:

generating image data according to an imaging result of an imaging device of the electronic device;

controlling operations of a data transmission status displaying part capable of notifying that the image data is output to an outside of the electronic device, the data transmission status displaying part including at least one of a light emitting diode, a speaker, and a display;

generating meta data according to local authentication of the image data performed using a machine learning device of the electronic device configured to recognize whether or not the image data include privacy information;

outputting the meta data to the outside when the local authentication is successful and outputting the image data to the outside when the local authentication fails; and causing the data transmission status displaying part to make a notification when the image data are transmitted to the outside and when the meta data are transmitted to the outside and the machine learning device has recognized that the image data include privacy information.

11. The method of claim 10, further comprising causing the data transmission status displaying part to make no notification when the image data do not represent a person.

12. The method of claim 10, further comprising causing the data transmission status displaying part to make different respective notifications for different types of data transmitted to the outside.

13. The method of claim 10, wherein an output destination of the image data is an application server.

14. The method of claim 10, wherein an output destination of the image data is an external storage medium.

15. The method of claim 10, further comprising causing the data transmission status displaying part not to make a notification when only the meta data are transmitted to the outside and the machine learning device has recognized that the image data do not include privacy information.

16. The method of claim 10, further comprising updating local authentication data of the machine learning device with update data received from the outside in response to the outputted image data.

* * * * *